United States Patent [19]

Drori

[11] Patent Number: 5,174,895
[45] Date of Patent: * Dec. 29, 1992

[54] COILED FILTER STRIP WITH UPSTREAM AND DOWNSTREAM BUTT ENDS

[76] Inventor: Mordeki Drori, P.O. Box 21538, Tel Aviv, Israel

[*] Notice: The portion of the term of this patent subsequent to May 14, 2008 has been disclaimed.

[21] Appl. No.: 567,638

[22] Filed: Aug. 15, 1990

Related U.S. Application Data

[63] Continuation of Ser. No. 297,496, Jan. 17, 1989, Pat. No. 5,015,379.

[30] Foreign Application Priority Data

Mar. 16, 1988 [IL] Israel ......................................... 85762

[51] Int. Cl.⁵ ............................................. B01D 27/07
[52] U.S. Cl. .................................. 210/411; 210/497.1; 210/488; 55/242; 55/498; 55/520
[58] Field of Search ...................... 210/411, 488, 497.1, 210/321.73, 321.74, 321.83, 409, 412, 410, 437, 457, 492, 493.4, 494.1; 55/242, 498, 520

[56] References Cited

U.S. PATENT DOCUMENTS 3,536,200 10/1970 Gigliotti .

FOREIGN PATENT DOCUMENTS

| | | |
|---|---|---|
| 275874 | 4/1965 | Australia . |
| 52363/64 | 6/1967 | Australia . |
| 570494 | 3/1985 | Australia . |
| 50717/85 | 7/1986 | Australia . |
| 51427/85 | 9/1986 | Australia . |
| 582431 | 10/1986 | Australia . |
| 578001 | 1/1987 | Australia . |
| 578401 | 1/1987 | Australia . |
| 205407A3 | 12/1986 | European Pat. Off. . |
| 2335214 | 10/1981 | Fed. Rep. of Germany . |
| 2629151 | 10/1982 | Fed. Rep. of Germany . |
| 8438393 | 6/1986 | Fed. Rep. of Germany . |
| 2645948 | 1/1987 | Fed. Rep. of Germany . |
| 79723 | 8/1986 | Israel . |
| 16204 | of 1895 | United Kingdom . |
| 11750 | of 1897 | United Kingdom . |
| 588991 | 7/1947 | United Kingdom . |
| 951404 | 3/1964 | United Kingdom . |

Primary Examiner—Robert A. Dawson
Assistant Examiner—Wanda L. Millard
Attorney, Agent, or Firm—Browdy and Neimark

[57] ABSTRACT

A filter element comprising at least one coiled filter strip defining first and second butt ends, one of the butt ends being arranged to define an upstream surface during normal filtering operation, receiving fluid to be filtered, and the other of the butt ends being arranged to define a downstream surface during normal filtering operation, through which filtered fluid leaves the coiled strip.

29 Claims, 9 Drawing Sheets

COILED FILTER STRIP WITH UPSTREAM AND DOWNSTREAM BUTT ENDS

This is a continuation, of application Ser. No. 07/297,496, filed Jan. 17, 1989, now U.S. Pat. No. 5,015,379.

FIELD OF THE INVENTION

The present invention relates to fluid filter apparatus generally and more particularly to backflushable filters for liquids, such as water.

BACKGROUND OF THE INVENTION

Various types of backflushable filters are known. A particularly useful type of such filters in the disk filter, which is comprised of a stack of filter disks. Disk filters are described and claimed in applicant's U.S. Pat. No. 4,683,060.

SUMMARY OF THE INVENTION

The present invention seeks to provide a new type of backflushable filter which is highly efficient, easy to clean, and relatively inexpensive to manufacture, and which provides, in a small physical area, a large filter surface area.

There is thus provided in accordance with a preferred embodiment of the present invention a filter element comprising at least one coiled filter strip defining first and second butt ends, one of the butt ends being arranged to define an upstream surface during normal filtering operation, receiving fluid to be filtered, and the other of the butt ends being arranged to define a downstream surface during normal filtering operation, through which filtered fluid leaves the coiled strip.

Additionally in accordance with an embodiment of the invention the filter strip is formed to have one surface defining an array of longitudinally extending filter grooves extending along the longitudinal axis of the filter strip and to have an opposite surface defining a spacer groove which engages filter grooves, when the filter strip is coiled, to define a filtration pathway of predetermined cross section and collection regions for particles which do not pass through the filtration pathway.

According to an alternative embodiment of the invention, the filter element is formed of at least two filter strips coiled together. Preferably, the at least two filter strips comprise a filtering strip and a spacer strip. The filtering strip may comprise a grooved strip or, preferably a porous strip.

Additionally in accordance with an embodiment of the present invention, the coiled filter strip or strips are held closely together by being coiled. Alternatively, the coil or the strips may be held in a tight condition by the use of adhesive or by welding, such as ultrasonic welding.

According to one embodiment of the invention, the coiled filter strip or strips may be coiled about a hollow tube.

Further in accordance with a preferred embodiment of the present invention, there is provided a backflushable filter comprising at least one filter element of the type described above and apparatus for supplying fluid to be filtered to a first end of the filter element defining an upstream filter element surface and for receiving filtered fluid from the opposite end thereof defining a downstream filter element surface.

Additionally in accordance with an embodiment of the invention, there is also provided means for supplying backflushing fluid to the downstream filter element surface and means for removing the fluid received from the upstream filter element surface.

Further in accordance with an embodiment of the invention, the means for removing includes means for vacuum scanning of the upstream filter element surface.

Still further in accordance with an embodiment of the present invention, there is provided a technique for manufacture of filter elements comprising the steps of extruding at least one filter strip, embossing the at least one filter strip with a groove pattern, and coiling the at least one filter strip.

Further in accordance with this embodiment of the invention, there is also provided the step of extruding over the coiled filter a cylindrical cover.

Additionally in accordance with an embodiment of the invention, following the step of extruding the cover, end caps, defining fluid inlets or outlets are fitted in sealing engagement over the coiled filter.

Further in accordance with an embodiment of the invention, there is also provided a step of securing the coiled filter strip in tight engagement which comprises the step of bonding, which may be achieved by means of adhesive or welding, such as ultrasonic welding.

BRIEF DESCRIPTION OF THE DRAWINGS

The present invention will be understood and appreciated more fully from the following detailed description taken in conjunction with the drawings in which.

DETAILED DESCRIPTION OF PREFERRED EMBODIMENTS

Figure 1:
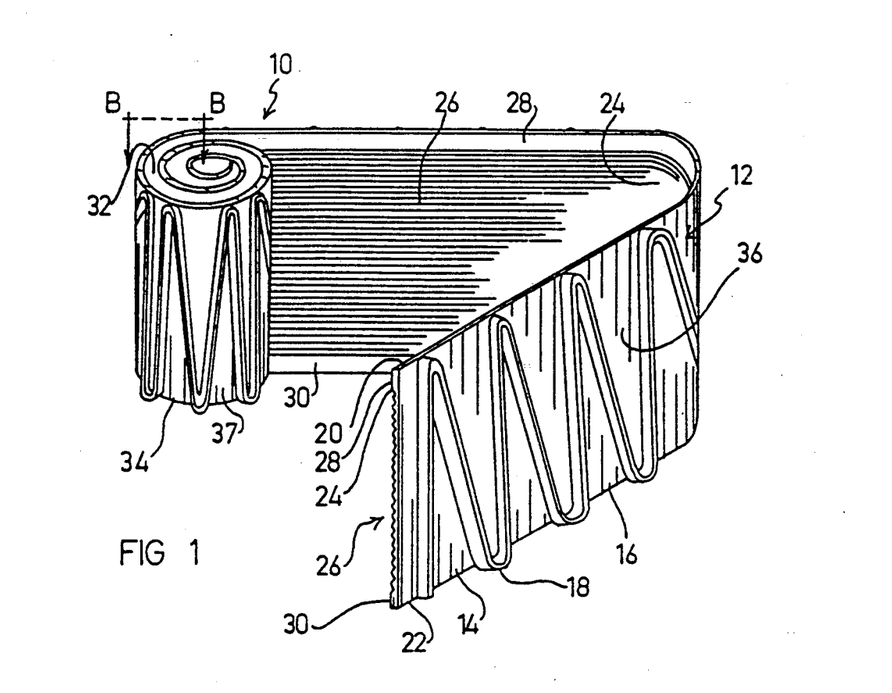
FIG. 1 illustrates a single filter strip in partially coiled orientation.

Reference is now made to FIG. 1, which illustrates a partially unwound filter element 10 formed of a coiled filter strip 12. In this embodiment of the invention, the filter strip 12 comprises a relatively thin strip of material, typically a flexible plastic having two different patterns formed thereon. On a first surface 14 there is typically provided a relatively smooth background surface 16 from which protrudes a spacer groove defining protrusion 18, typically in the form of a generally sinusoidal, undulating wave, which extends generally back and forth between first and second edges 20 and 22 of the surface.

Spacer groove defining protrusion 18 is preferably but not necessarily of uniform thickness and may be of any desired thickness, depending on the size of the particles to be filtered.

On a second, opposite surface 24 of strip 12, there is formed an array 26 of filter grooves, which extend generally transversely with respect to spacer groove defining protrusion 18, except at the points of inflection thereof, adjacent the first and second edges 20 and 22. The filter grooves of array 26 are sized so as to provide precisely defined filtration down to particles of a given minimum size.

Filter groove array 26 is typically bordered adjacent both edges 20 and 22 by non-grooved raised portions 28 and 30 respectively, which correspond in thickness to the height of the peaks of the interstices between the grooves of array 26.

It will be appreciated that a complete filter element employing a coiled filter strip of the type illustrated in FIG. 1, will have upstream and downstream filter surfaces for inlet of a fluid such as water to be filtered and exit thereof, respectively, at either of its butt ends 32 and 34, defined respectively by edges 20 and 22. The filter strip 12 illustrated in FIG. 1 is symmetrical with respect to edges 20 and 22 and thus it does not matter which butt end is coupled as the upstream filter surface. Alternatively, the filter strip 12 may be modified in one of a wide variety of ways to render it non-symmetric.

One possible modification would be to make the spacer grooves defined by protrusion 18 and facing edge 20 of larger area than those spacer grooves facing edge 22. Other modifications are also possible.

It is noted that when filter element 10 is ready for use, it is tightly wound together and may, if desired, by bonded together by any suitable technique, such as adhesive bonding or ultrasonic welding, such that the outer facing edge of protrusion 18 sealingly engages borders 28 and 30 where they are in facing relationship and also sealingly engages the peaks of the interstices between the grooves of array 26. A sectional illustration of this engagement is provided in FIG. 1B.

Figures 1B, 2C, 3, 3B:
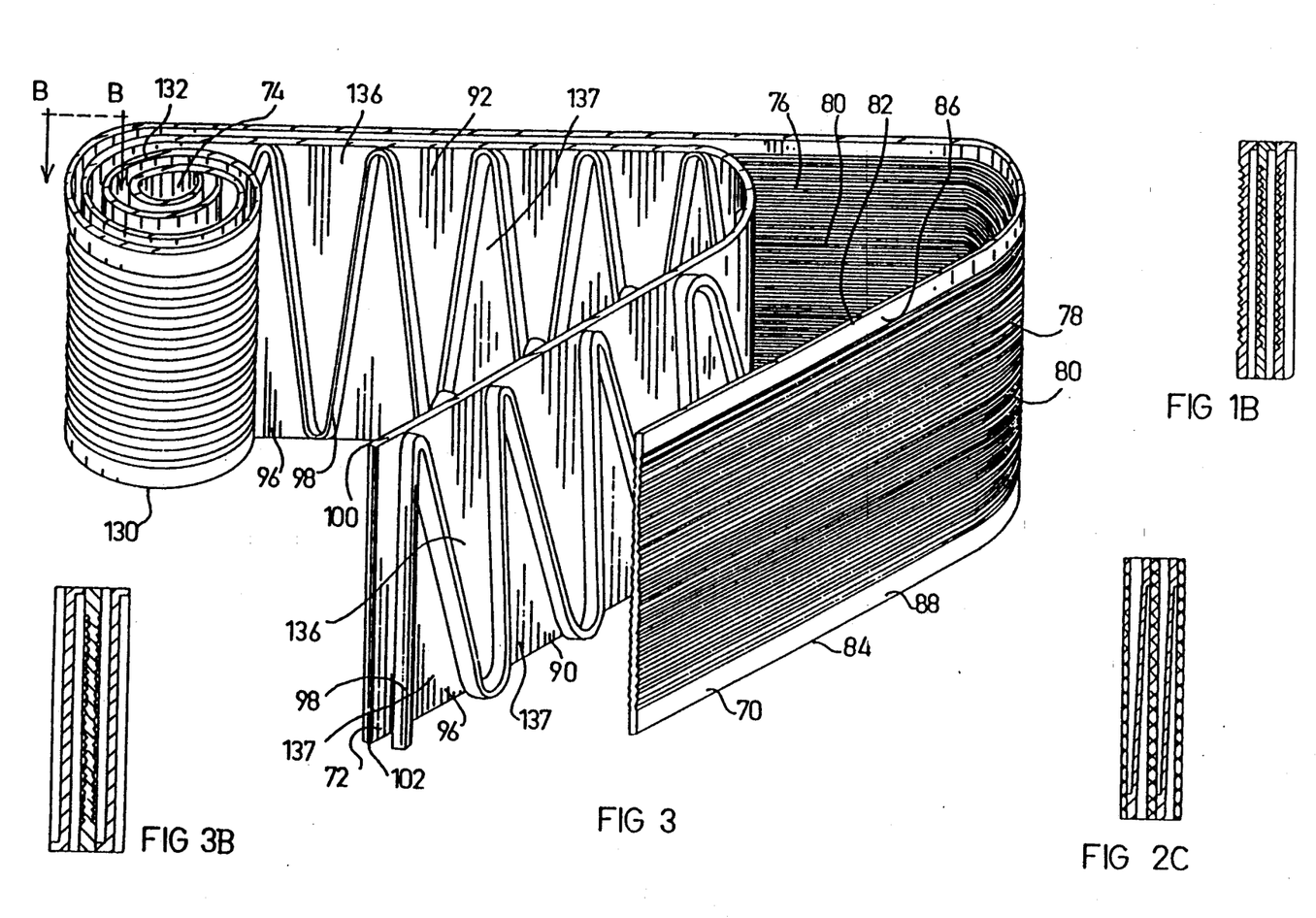
FIG. 1B shows a sectional illustration of the single filter strip of FIG. 1 in coiled orientation.
FIG. 2C shows a sectional illustration of the pair of filter strips of FIG. 2 taken along lines C—C, in coiled orientation.
FIG. 3 illustrates a pair of filter strips in partially coiled orientation in accordance with another embodiment of the invention.
FIG. 3B shows a sectional illustration of the pair of filter strips of FIG. 3 in coiled orientation.

Assuming, for the purposes of discussion that the upstream end of the filter element 10 is at end 32, it is appreciated that fluid, such as water to be filtered, enters the filter at end 32 and passes through dirt accumulation grooves 36 which are defined by protrusion 18 and communicate with the upstream end 32 and then passes through the cross-sectional areas of the filter grooves of array 26, past the juxtaposed portion of facing protrusion 18, as illustrated in FIG. 1B. The thus filtered fluid, then passes through exit grooves 37 as it exits via downstream end 34.

Figure 2:
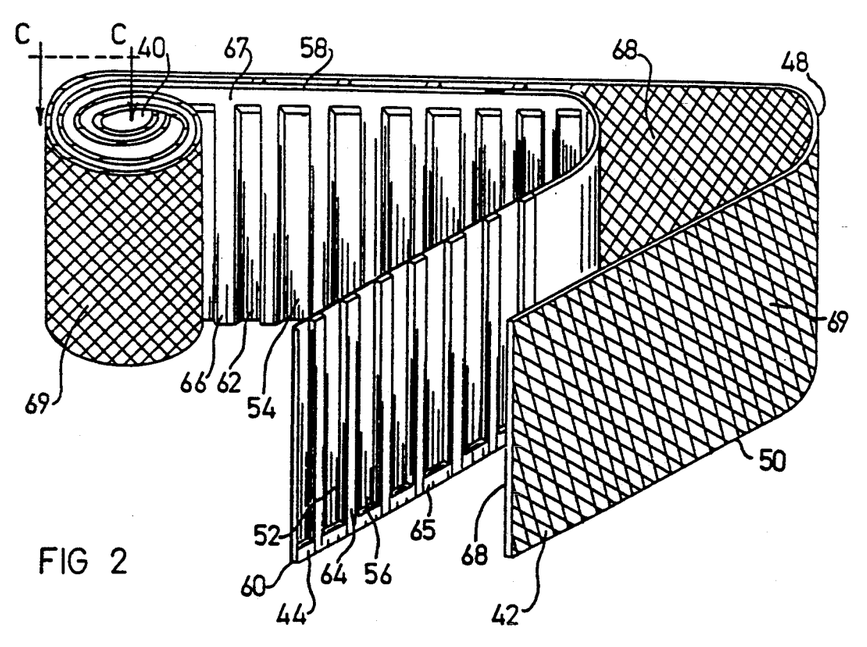
FIG. 2 illustrates a pair of filter strips in partially coiled orientation in accordance with one embodiment of the invention.

Reference is now made to FIG. 2 which illustrates an alternative embodiment of filter element 10, which is comprised of two filter strips 42 and 44 coiled together. Filter strip 42 is typically formed of a porous material, such as polyester cartridge or polypropylene cartridge or any desired type of mesh and defines first and second edges 48 and 50. For the purposes of description herein, it is assumed that edge 48 is located at the upstream end of the element 40, and that edge 50 is located at the downstream end of the element. It is specifically noted that the filter strip 42 may be formed of porous material of any desired characteristics and pass through specifications and that the term, "porous material" as used herein, also includes screen material of any suitable mesh size. It also includes single or multiple layer porous material with uniform or different pass through characteristics.

Filter strip 44 typically defines a spacer strip having spacer groove patterns formed on opposite surfaces 52 and 54 thereof and respective edges 58 and 60. On surface 52, there is defined a groove pattern defining debris collecting grooves 56 communicating with edge 58, while on surface 54 there are defined generally back-to-back with grooves 56, exit grooves 62, communicating with edge 60.

Grooves 56 are defined by raised portions 64 which include a raised border 65 adjacent edge 60, while grooves 62 are defined by raised portions 66, which include a raised border 67 adjacent edge 58.

Figure 2B:
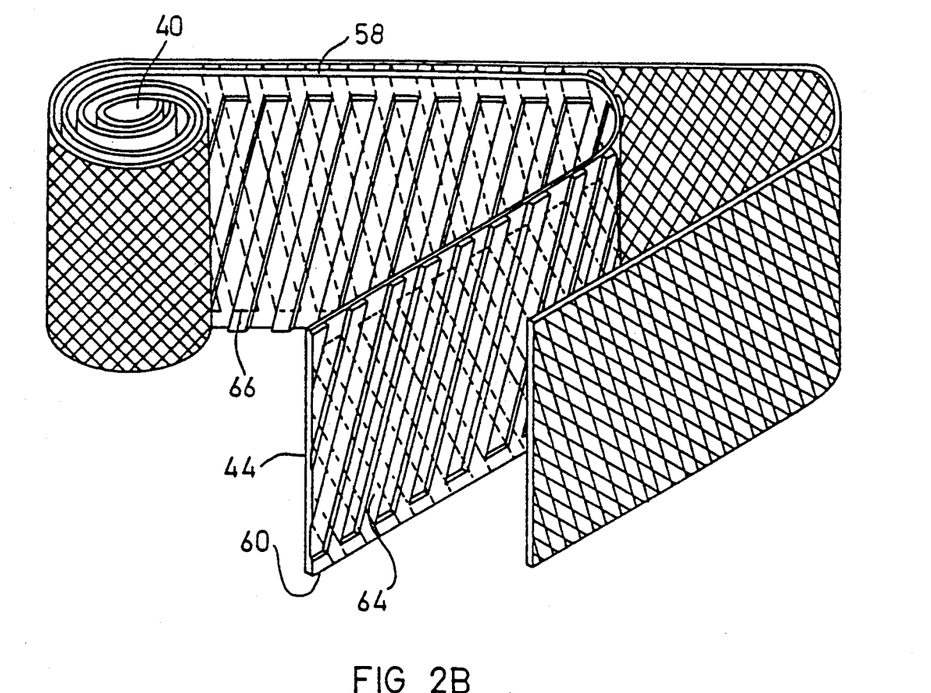
FIG. 2B illustrates a pair of filter strips in partially coiled orientation according to an alternative embodiment of the present invention.

In order to provide maximum structural strength to spacer strip 44, the raised portions 64 and 66 can be somewhat skewed with respect to each other as illustrated in FIG. 2B, such that raised portion 64 will diagonally overlie raised portion 66. This arrangement enables the planar portion of surfaces 52 and 54 to be made very thin.

It is noted that when filter element 40 is ready for use, it is tightly wound together and may, if desired, be bonded together by any suitable technique, such as adhesive bonding or ultrasonic welding, such that the inner facing edge 68 of porous filter strip 42 sealingly engages raised portions 64 and border 65 of spacer strip 44 to define debris collection chambers. Similarly, it is preferred but not essential, that outer facing surface 69 of porous filter strip 42 sealingly engage raised portions 66 and border 67 of spacer strip 44. A sectional illustration of this engagement is provided in FIG. 2C.

Reference is now made to FIG. 3 which illustrates yet another configuration of filter element constructed and operative in accordance with a preferred embodiment of the present invention and which has similarities to both of the embodiments described hereinabove. The embodiment of FIG. 3 comprises two filter strips 70 and 72 which are coiled together to define a filter element 74.

Filter strip 70 is typically formed with identical first and second side surfaces 76 and 78, each of which is formed with a generally longitudinally extending groove array 80, which may be similar in all relevant respects to groove array 26 described in connection with the embodiment of FIG. 1, hereinabove, and which is bordered along respective first and second edges 82 and 84 by raised border portions 86 and 88 respectively.

Filter strip 72 is typically formed with identical first and second side surfaces 90 and 92, each of which is formed with a relatively smooth background surface 96 from which protrudes a spacer groove defining protrusion 98, typically in the form of a generally sinusoidal, undulating wave, which extends generally back and forth between first and second edges 100 and 102 of the surface.

Spacer groove defining protrusions 98 are preferably but not necessarily of uniform thickness and may be of any desired thickness depending on the size of the particles to be filtered.

It will be appreciated that a complete filter element employing a coiled filter strip of the type illustrated in FIG. 3, will have upstream and downstream filter surfaces for inlet of a fluid such as water to be filtered and exit thereof, respectively, at either of its butt ends 130 and 132.

The filter element 74 is symmetrical with respect to ends 130 and 132 and thus it does not matter which butt end is coupled as the upstream filter surface. Alternatively, the filter strip 72 may be modified in one of a wide variety of ways to render it non-symmetric.

One possible modification would be to make the spacer grooves defined by protrusion 98 and facing edge 100 of larger area than those spacer grooves facing edge 102. Other modifications are also possible.

When filter element 74 is ready for use, it is tightly wound together and may, if desired, be bonded together by any suitable technique, such as adhesive bonding or ultrasonic welding, such that the outer facing edge of protrusion 98 sealingly engages borders 86 and 88 where they are in facing relationship and also sealingly engages the peaks of the interstices between the grooves of array 80. A sectional illustration of this engagement is provided in FIG. 3B.

Assuming, for the purposes of discussion, that the upstream end of the filter element 74 is at end 132, it is appreciated that fluid, such as water to be filtered, enters the filter at end 132 and passes through dirt accumulation grooves 136 which are defined by protrusion 98 and communicate with the upstream end 132 and then pass through the cross-sectional areas of the filter grooves of array 80, past the juxtaposed portion of facing protrusion 98, as illustrated in FIG. 3B. The thus filtered fluid, then passes through exit grooves 137 as it exits via downstream end 130.

Figure 4:
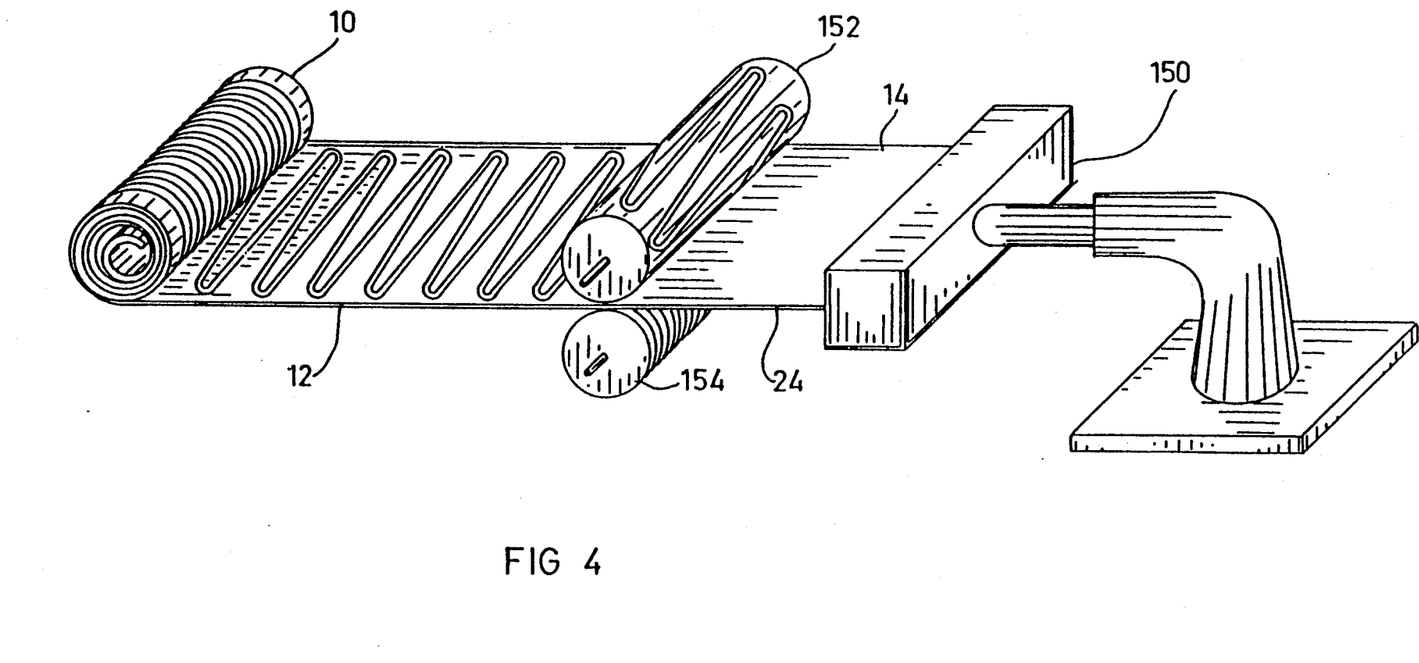
FIG. 4 illustrates a technique for producing a coiled filter strip of the type shown in FIG. 1.

Reference is now made to FIG. 4 which illustrates apparatus for producing a filter strip of the type illustrated in FIG. 1. A strip extruder 150, receives a supply of a thermoplastic material such as polyethylene or polypropylene or any similar desired material and produces a strip of such material. While the strip is still hot and formable, it passes between a pair of embossing rollers 152 and 154. which respectively form thereon the patterns formed on respective surfaces 24 and 14 of strip 12 (FIG. 1). The strip is then coiled to form the filter element 10. If coiled while still in a plastic state, simple tight coiling may be sufficient to hold the coil sufficiently tightly together such that it is effectively heat welded without requiring any additional heat welding step.

Figure 5:
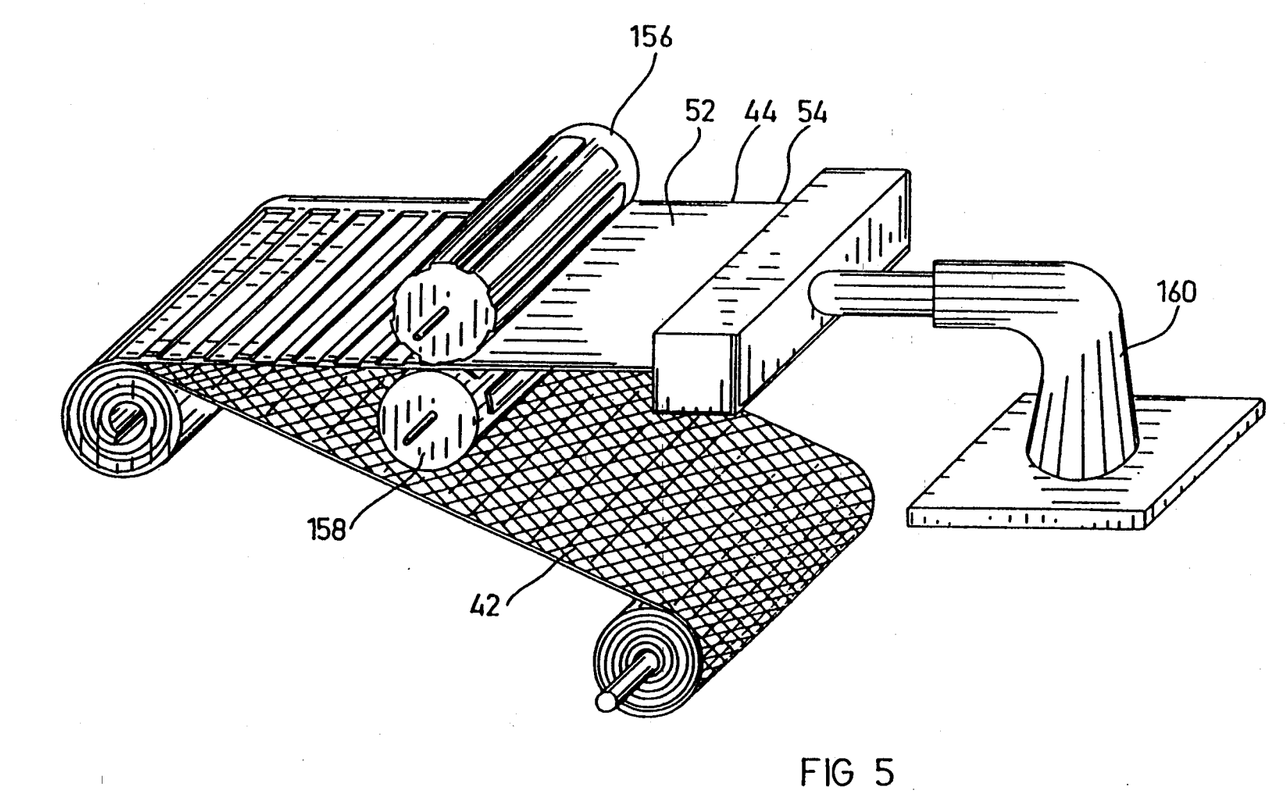
FIG. 5 illustrates a technique for producing coiled filter strips of the type shown in FIG. 2.

FIG. 5 illustrates the corresponding production of the filter element of FIG. 2, it being noted that the porous strip 42 is not embossed but the spacer strip 44 is embossed on both sides by rollers 156 and 158 with the respective patterns which appear on surfaces 52 and 54 thereof. The extrusion apparatus 160 may be identical to that employed in the embodiment shown in FIG. 4.

Figure 6A:
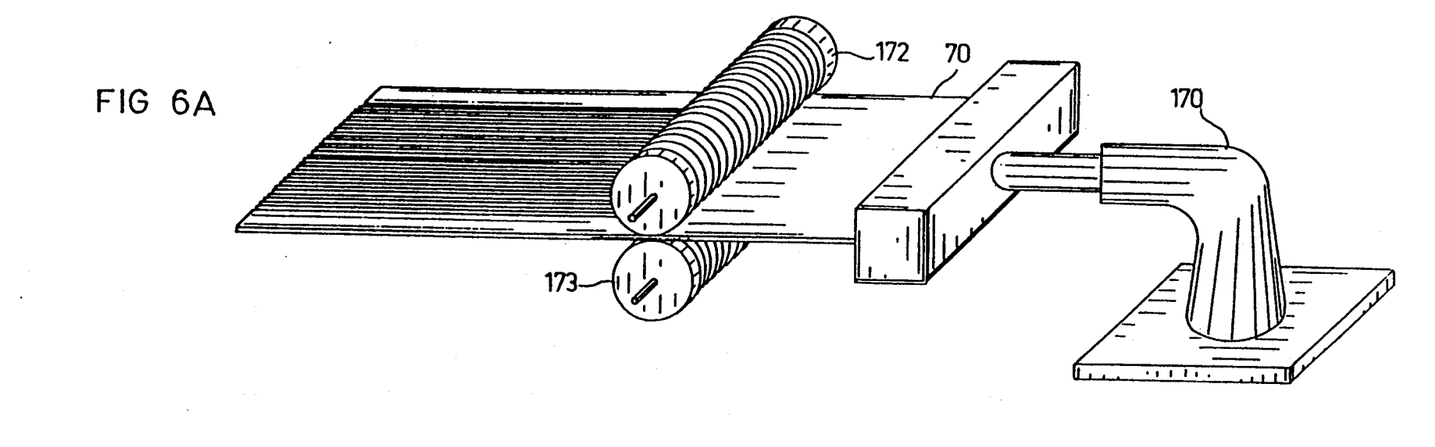
FIG. 6A and FIG. 6B illustrate a technique for producing coiled filter strips of the type shown in FIG. 3.
Figure 6B:
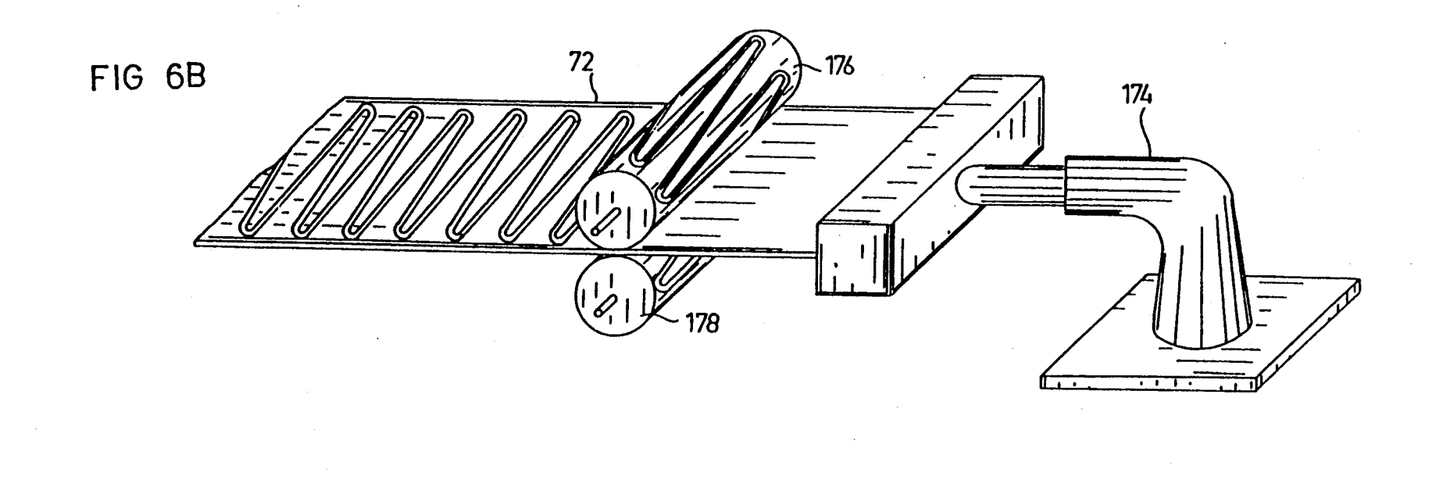

FIG. 6A and FIG. 6B illustrate the production of the filter element of FIG. 3. The strip 70 is produced by an extruder 170 and embossing rollers 172 and 173, while the strip 72 is produced by an extruder 174 and embossing rollers 176 and 178. The two embossed strips are then rolled together to define filter element 74.

Figures 7, 7B:
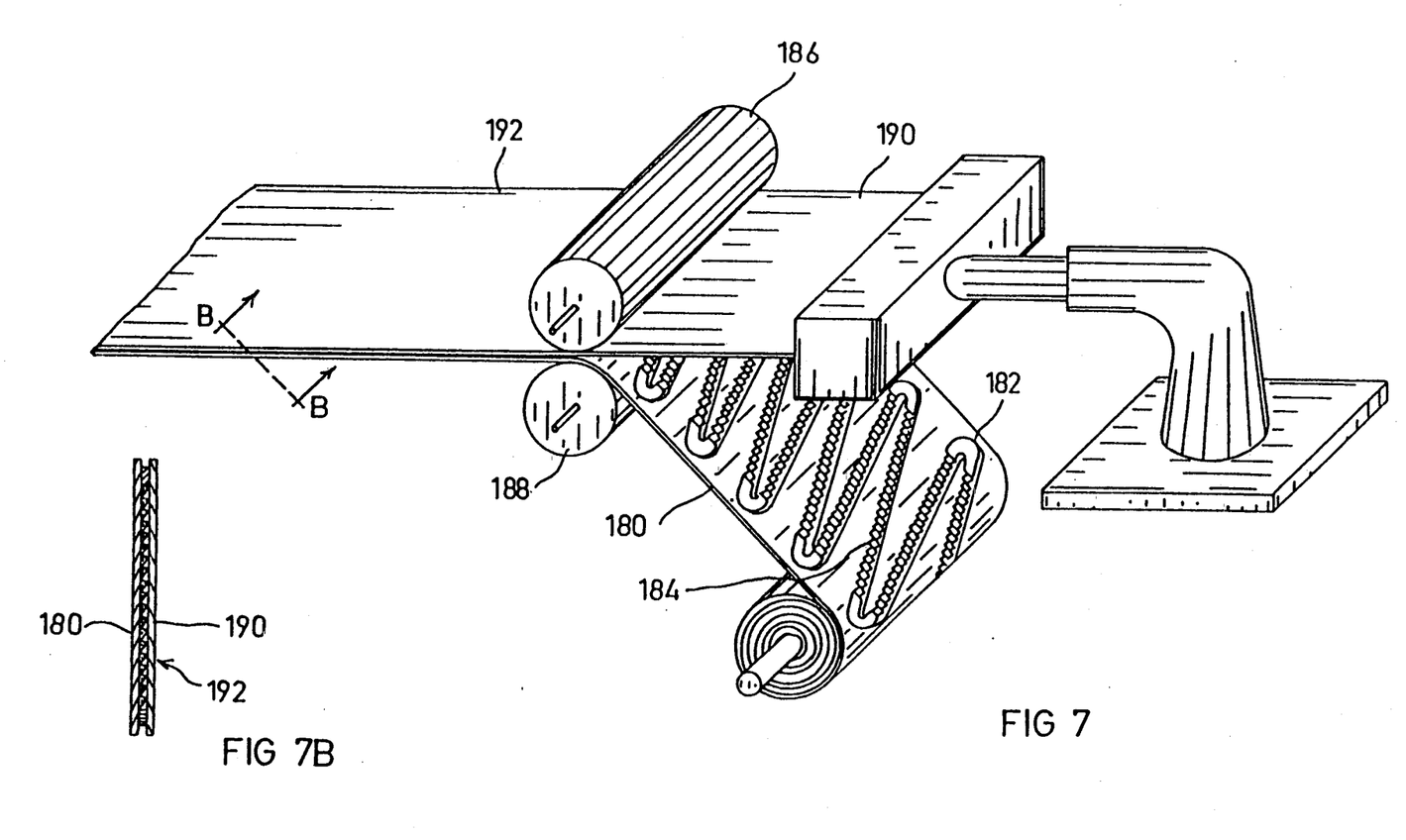
FIG. 7 illustrates a technique for producing coiled filter strips according to an alternative embodiment of the present invention.
FIG. 7B shows a sectional illustration of the coiled filter strips produced by the technique of FIG. 7.

FIG. 7 illustrates an alternative embodiment of the invention, wherein a first filter strip 180 having formed thereon an embossed pattern of, possibly but not necessarily skewed, spacer protrusions 182 of the type typically illustrated in FIG. 1, and having formed on the spacer protrusions transverse filter grooves 184, is heat welded by conventional welding rollers 186 and 188 to a smooth strip 190 thus producing a filter strip 192 having the cross sectional configuration illustrated in FIG. 7. Filter strip 192 will be used similarly to the type illustrated in FIG. 1, to form filter element 10, it being noted that filter strip 180 is embossed on one side only so that both outer surfaces of the filter strip 192 will be smooth.

Figures 8, 9A, 9B, 9C:
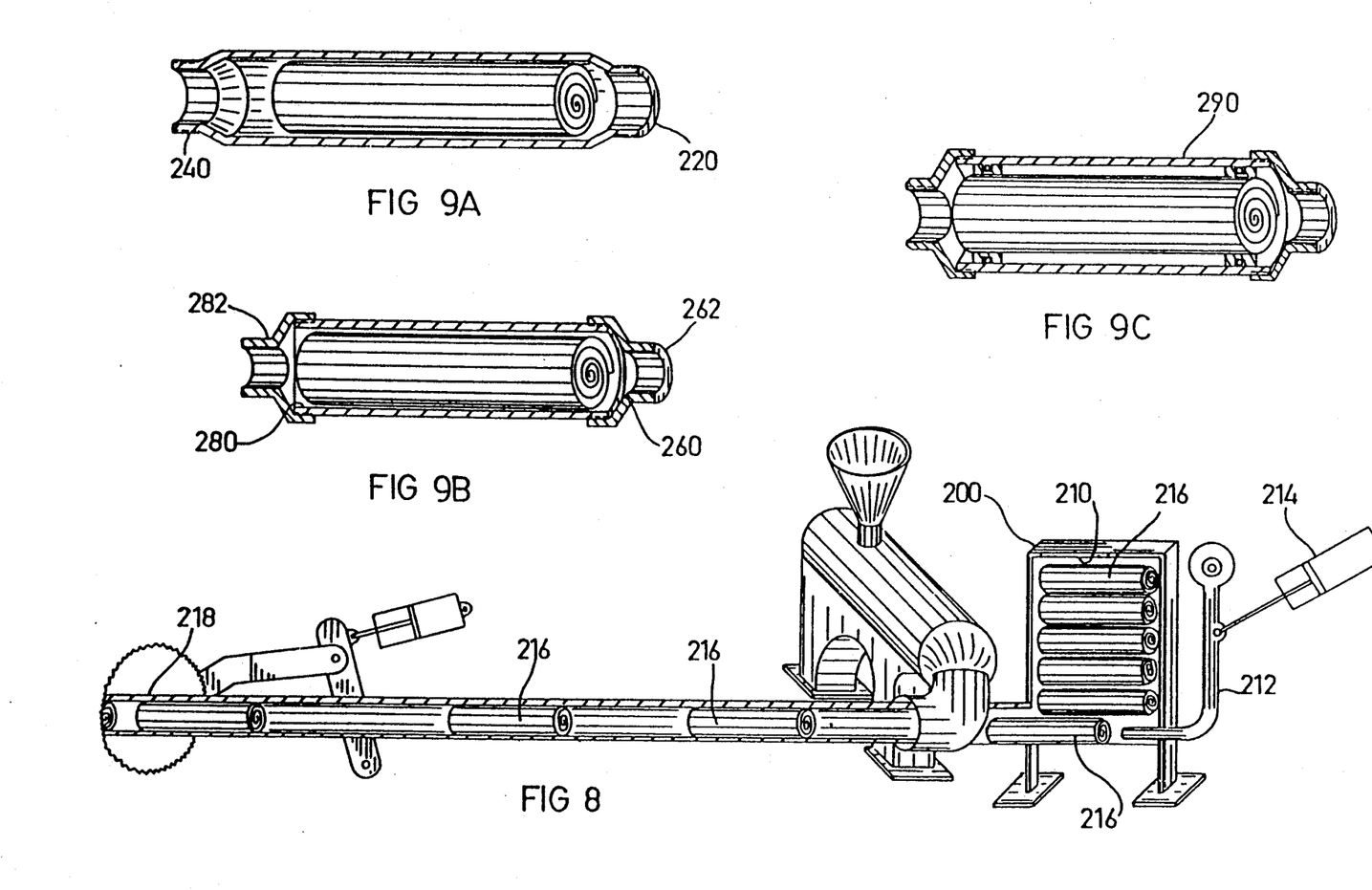
FIG. 8 illustrates an extrusion technique for enclosing coiled filter strips.
FIGS. 9A, 9B and 9C, illustrate three alternative embodiments of coiled, enclosed filter strips.

Reference is now made to FIG. 8, which illustrates apparatus for extruding a generally cylindrical covering over a coiled filter element of the type described hereinabove. The apparatus of FIG. 8 includes coil feeding means 200, including a storage rack 210 and a pusher arm 212, which may be operated by a piston 214, which automatically inserts coiled filter strips 216 of the type described hereinabove into an angled extrusion head of a conventional extruder. The extruded product is effectively a continuous extruded tube, having disposed therein at spaced intervals, coiled filter elements 216.

The thus coated and sealed coiled filter elements are then trimmed by trimming apparatus 218 and are ready for further processing.

FIG. 9A illustrates a coated coiled filter element such as could be produced by the apparatus of FIG. 8 with coupling ends 220 and 220 which may be used for attachment of the filter element to supply and drain connections.

FIG. 9B shows an alternative arrangement of coated coiled filter element with butt ends 260 and 280 which may be attached to connectors 262 and 282 intermediate the filter element and a supply or drain connection.

FIG. 9C shows a coated coiled filter element which is essentially similar to that of FIG. 9B, but held inside a housing 290 by sealing rings 292 which are so positioned as to seal the inlet and the outlet.

Figure 10:
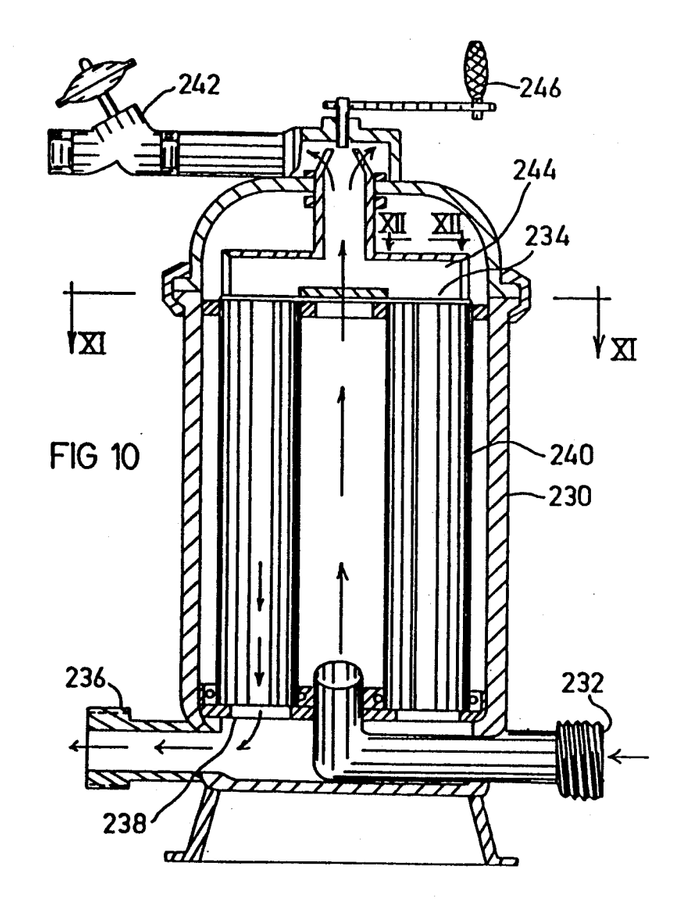
FIG. 10 is a side view interior illustration of a backflushable filter constructed and operative in accordance with a preferred embodiment of the present invention and employing filter elements formed of coiled filter strips.
Figure 11:
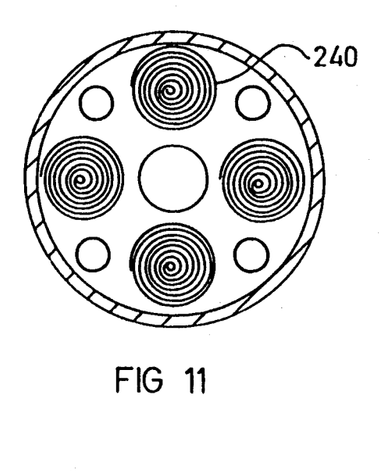
FIG. 11 is a sectional illustration taken along the lines XI—XI of FIG. 10.
Figure 12:
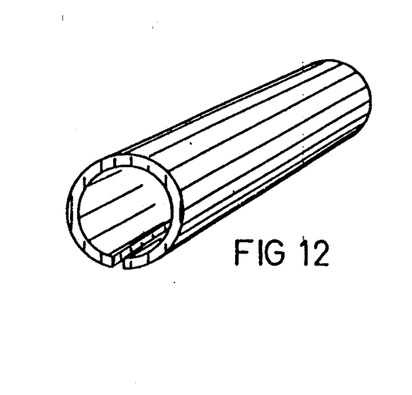
FIG. 12 is a pictorial illustration of a detail of the backflushing apparatus taken along the lines XII—XII of FIG. 10.

FIGS. 10, 11 and 12 illustrate a backwashable filter constructed and operative in accordance with a preferred embodiment of the present invention and comprising a housing 230 defining a water inlet 232 communicating with a top manifold 234 and a filtered water outlet 236 communicating with a bottom manifold 238.

A plurality of coiled filter elements 240 of the type described hereinabove are located within the housing 230 with a first end thereof in water receiving communication with the inlet top manifold 234 and a second end thereof in filtered water providing relationship with the bottom manifold 238.

Backflushing is provided by opening the draining valve 242 and by manual rotation of vacuum element 244 by means of handle 246. Vacuum element 244 as it scans each coiled filter element at its upstream end, sucks up the particles accumulated therein.

Figure 13:
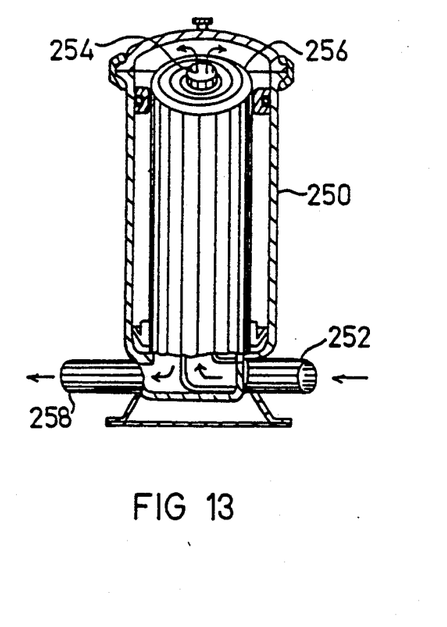
FIGS. 13 and 14 are side view interior illustrations of two alternative types of filters employing a filter element formed of a coiled filter strip having a central flowthrough passage formed therein.

FIG. 13 illustrates an alternative filter construction including a housing 250 and a water inlet 252 which communicates with a fluid flow path 254 formed at the center of a coiled filter element 256. The fluid flow path 254 can conveniently be formed by coiling filter strips around a hollow tube, using essentially the same production techniques as described hereinabove.

Water exiting from path 254 enters the filter element at an upstream end 256 and exits therefrom from a downstream end 258.

Figure 14:
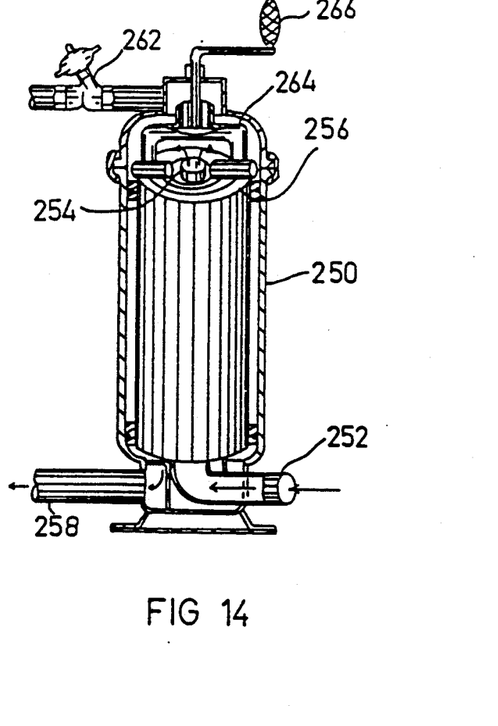

FIG. 14 describes a backflushable filter of the type illustrated in FIG. 13. Backflushing is provided by opening the draining valve 262 and by manual rotation of vacuum element 264 by means of handle 266. Vacuum element 264 scans the filter element at its upstream end and sucks up the particles accumulated therein.

It will be appreciated by persons skilled in the art that the present invention is not limited to what has been particularly shown and described hereinbelow. Rather the scope of the present invention will be defined only by the claims which follow:

I claim:

1. A filter element comprising:
at least one coiled filter strip defining first and second butt ends, one of the butt ends being arranged to define an upstream surface during normal filtering operation, receiving fluid to be filtered, and the other of the butt ends being arranged to define a downstream surface during normal filtering operation, through which filtered fluid leaves the coiled strip.

2. Apparatus according to claim 1 and wherein said filter element is formed of at least two filter strips coiled together.

3. Apparatus according to claim 2 and wherein said at least two filter strips comprise a filtering strip and a spacer strip.

4. Apparatus according to claim 3 and wherein said filtering strip comprises a porous strip.

5. Apparatus according to claim 3 and wherein said filtering strip comprises a grooved strip.

6. Apparatus according to claim 1 and wherein said at least one filter strip is formed to have one surface defining an array of longitudinally extending filter grooves extending along the longitudinal axis of the filter strip and to have an opposite surface defining a spacer groove which engages filter grooves, when the filter strip is coiled, to define a filtration pathway of predetermined cross section and accumulation regions for particles which do not pass through the filtration pathway.

7. Apparatus according to claim 6 and wherein said at least one coiled filter strip is held closely together by being coiled.

8. Apparatus according to claim 6 and wherein said at least one coiled filter strip is held closely together by welding.

9. Apparatus according to claim 6 and wherein said at least one coiled filter strip is coiled about a hollow tube.

10. A backflushable filter comprising at least one filter element according to claim 1 apparatus for supplying fluid to be filtered to a first end of the filter element defining an upstream filter element surface and for receiving filtered fluid from the opposite end thereof defining a downstream filter element surface.

11. A backflushable filter according to claim 10 and also comprising means for supplying backflushing fluid to the downstream filter element surface and for means for removing the fluid received from the upstream filter element surface.

12. A backflushable filter according to claim 11 and wherein said means for removing includes means for vacuum scanning of the upstream filter element surface.

13. Apparatus according to claim 1 and wherein said at least one coiled filter strip is held closely together by being coiled.

14. Apparatus according to claim 1 and wherein said at least one coiled filter strip is held closely together by the use of adhesive.

15. Apparatus according to claim 1 and wherein said at least one coiled filter strip is coiled about a hollow tube.

16. A filter element comprising:
at least one rolled strip having a raised line portion on at least a first surface thereof, the raised line portion having a generally zig-zag configuration, wherein the second surface of at least one rolled strip and the raised line portion of the first surface of at least one rolled strip from a serrated filtration pathway, the serrated filtration pathway defining a plurality of upstream chambers associated with a fluid inlet and a plurality of downstream chambers associated with a fluid outlet.

17. A filter element according to claim 16 wherein the second surface of the rolled strip having a raised line portion on the first surface thereof defines a plurality of filter grooves extending along the longitudinal axis of the filters strip.

18. A filter element according to claim 17 and also comprising backflushing means for scanning the upstream chambers and for sucking particles accumulating thereat.

19. A filter element according to claim 17 and also comprising backflushing means for directing pressurized backflushing fluid at the downstream chambers and forcing particles accumulating thereat through the upstream chambers, thereby to cleanse the filter element from the particles.

20. A filter element according to claim 16 wherein said at least one rolled strip comprises first and second rolled strips, the first rolled strip having said raised line portion on at least a first surface thereof and at least a first surface of the second rolled strip defining a plurality of filter grooves extending along the longitudinal axis of the filter strip.

21. A filter element according to claim 20 and also comprising backflushing means for scanning the upstream chambers and for sucking particles accumulating thereat.

22. A filter element according to claim 20 and also comprising backflushing means for directing pressurized backflushing fluid at the downstream chambers and forcing particles accumulating thereat through the upstream chambers, thereby to cleanse the filter element from the particles.

23. A filter element according to claim 16 and also comprising backflushing means for scanning the upstream chambers and for sucking particles accumulating thereat.

24. A filter element according to claim 16 and also comprising backflushing means for directing pressurized backflushing fluid at the downstream chambers and forcing particles accumulating thereat through the upstream chambers thereby to cleanse the filter element from the particles.

25. A filter element according to claim 16 and also comprising a generally cylindrical pressurized housing element for housing said at least one rolled strip, characterized in that said fluid inlet and said fluid outlet are formed in said housing element.

26. A filter element comprising a plurality of rolled strips defining upstream and downstream butt ends, the plurality of rolled strips comprising a porous strip and a spacer strip, wherein a surface of the porous strip is operatively associated with a surface of the spacer strip such that a plurality of filtering chambers are defined, the filtering chambers being open to only one butt end of the plurality of rolled strips,
    characterized in that each filtering chamber open to only the upstream butt and is disposed generally opposite a corresponding filtering chamber open to only the downstream butt end, the corresponding filtering chambers being separated by the porous strip.

27. A filter element according to claim 26 and also comprising backflushing means for scanning the filtering chambers open to the upstream butt end and for sucking particles accumulating thereat.

28. A filter element according to claim 27 and also comprising backflushing means for directing pressurized backflushing fluid at the filtering chambers open to the downstream butt end and for forcing particles accumulating thereat through the upstream chambers, thereby to cleanse the filter element from the particles.

29. A filter element according to claim 26 and also comprising a generally cylindrical pressurized housing element for housing said plurality of rolled strips, characterized in that a fluid inlet and a fluid outlet are formed in the housing element.

* * * * *